US012720333B2

(12) United States Patent
Pu et al.

(10) Patent No.: US 12,720,333 B2
(45) Date of Patent: Aug. 25, 2026

(54) METHOD FOR CONFIGURING GAP, TERMINAL, AND NETWORK DEVICE

(71) Applicant: VIVO MOBILE COMMUNICATION CO., LTD., Guangdong (CN)

(72) Inventors: Wenjuan Pu, Guangdong (CN); Wei Bao, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 303 days.

(21) Appl. No.: 18/543,106

(22) Filed: Dec. 18, 2023

(65) Prior Publication Data

US 2024/0121635 A1 Apr. 11, 2024

Related U.S. Application Data

(63) Continuation of application No. PCT/CN2022/099588, filed on Jun. 17, 2022.

(30) Foreign Application Priority Data

Jun. 18, 2021 (CN) ........................ 202110681013.X

(51) Int. Cl.
*H04W 24/02* (2009.01)
*H04W 36/36* (2009.01)
*H04W 76/15* (2018.01)

(52) U.S. Cl.
CPC ......... *H04W 24/02* (2013.01); *H04W 36/362* (2023.05); *H04W 76/15* (2018.02)

(58) Field of Classification Search
CPC ... H04W 24/02; H04W 36/362; H04W 76/15; H04W 72/0446; H04W 76/28; H04W 72/04
See application file for complete search history.

(56) References Cited

U.S. PATENT DOCUMENTS

2017/0048108 A1* 2/2017 Yi ........................ H04W 24/08
2021/0377978 A1* 12/2021 Ozturk ............. H04W 72/1268

FOREIGN PATENT DOCUMENTS

| | | | |
|---|---|---|---|
| CN | 109716855 | A | 5/2019 |
| WO | 2015167303 | A1 | 11/2015 |
| WO | 2019194729 | A1 | 10/2019 |

(Continued)

OTHER PUBLICATIONS

Nokia, Nokia Shanghai Bell, “Discussion on FFS issue in NR SA NeedForGap Signalling”, 3GPP TSG-RAN WG2 Meeting #109e, R2-2001445, Feb. 24-Mar. 6, 2020, Elbonia.

(Continued)

*Primary Examiner* — Nizam U Ahmed
(74) *Attorney, Agent, or Firm* — Foley & Lardner LLP

(57) ABSTRACT

A method for configuring gap, a terminal, and a network device are provided. The method for configuring gap in the embodiments of this application includes: sending, by a terminal, a first request to a network device, where the first request is used to request the network device to configure or reconfigure at least one gap, and the at least one gap is a gap related to a dual connectivity (DC) state; and receiving, by the terminal, gap configuration information sent by the network device, where the gap configuration information is used to configure or reconfigure the at least one gap.

20 Claims, 6 Drawing Sheets

(56) References Cited

FOREIGN PATENT DOCUMENTS

| | | |
|---|---|---|
| WO | 2021031060 A1 | 2/2021 |
| WO | 2021063200 A1 | 4/2021 |

OTHER PUBLICATIONS

Nokia, Nokia Shanghai Bell, BT Plc, "Discussion on NeedForGap signalling in MR-DC", 3GPP TSG-RAN WG2 Meeting #113 Electronic, R2-2101032, Jan. 25-Feb. 5, 2021, Elbonia.

CMCC, "SMTC and measurement Gap configuration for NTN", 3GPP TSG-RAN WG2 #114 electronic, R2-2106232, May 19-27, 2021, Online.

VIVO, "[post 112-e][256][Multi-SIM] Network switching details (vivo)", 3GPP TSG-RAN WG2 Meeting #113-e, R2-2100474, Online, Jan. 25-Feb. 5, 2021.

CATT, "Summary of [103#52][NR late drop] MR-DC measurement and gap configuration framework", 3GPP TSG-RAN WG2 Meeting #103bis, R2-1813838, Chengdu, China Oct. 8-12, 2018.

Mediatek Inc., "Multiple concurrent and independent gap patterns", 3GPP TSG-RAN WG4 Meeting #98-e, R4-2101063, Electronic Meeting, Jan. 25-Feb 5, 2021.

Mediatek Inc., "Network Controlled Small Gap", 3GPP TSG-RAN WG4 Meeting #98-bis-e, R4-2104584, Electronic Meeting, Apr. 12-20, 2021.

* cited by examiner

METHOD FOR CONFIGURING GAP, TERMINAL, AND NETWORK DEVICE

CROSS-REFERENCE TO RELATED APPLICATIONS

The present invention is a continuation application of PCT International Application No. PCT/CN2022/099588 filed on Jun. 17, 2022, which claims priority to Chinese Patent Application No. 202110681013.X, filed with the China National Intellectual Property Administration on Jun. 18, 2021, and entitled "METHOD FOR CONFIGURING GAP, TERMINAL, AND NETWORK DEVICE", the disclosures of which are incorporated herein by reference in their entireties.

TECHNICAL FIELD

This application pertains to the field of wireless communication technologies, and in particular, to a method for configuring gap, a terminal, and a network device.

BACKGROUND

In the 5th (5th Generation, 5G) mobile communication system, user equipment (UE, that is, a terminal) may be in a dual connectivity (DC) architecture. The DC architecture can provide resources of two network nodes (access network elements) for the UE, one network node is referred to as a master node (MN), and the other network node is referred to as a secondary node (SN). The carrier aggregation (CA) technology may be used for each network node, and a series of serving cells controlled by the network node are configured for the UE, which is also referred to as a cell group. A cell group controlled by the MN is referred to as a master cell group (MCG), and a cell group controlled by the SN is referred to as a secondary cell group (SCG).

However, in the related art, when the UE needs to request to configure a gap required for service execution, there is a problem that gap configuration flexibility is poor, which affects communication performance of the UE in the DC architecture.

SUMMARY

Embodiments of this application provide a method for configuring gap, a terminal, and a network device.

According to a first aspect, a method for configuring gap is provided, including: sending, by a terminal, a first request to a network device, where the first request is used to request the network device to configure or reconfigure at least one gap, and the at least one gap is a gap related to a dual connectivity (DC) state; and receiving, by the terminal, gap configuration information sent by the network device, where the gap configuration information is used to configure or reconfigure the at least one gap.

According to a second aspect, a method for configuring gap is provided, including: receiving, by a network device, a first request sent by a terminal, where the first request is used to request the network device to configure or reconfigure at least one gap, and the at least one gap is a gap related to a dual connectivity (DC) state; and sending, by the network device, gap configuration information to the terminal, where the gap configuration information is used for the terminal to configure or reconfigure the at least one gap.

According to a third aspect, an apparatus for configuring gap is provided and applied to a terminal. The apparatus includes: a first sending module, configured to send a first request to a network device, where the first request is used to request the network device to configure or reconfigure at least one gap, and the at least one gap is a gap related to a dual connectivity (DC) state; and a first receiving module, configured to receive gap configuration information sent by the network device, where the gap configuration information is used to configure or reconfigure the at least one gap.

According to a fourth aspect, an apparatus for configuring gap is provided and applied to a network device. The apparatus includes: a second receiving module, configured to receive a first request sent by a terminal, where the first request is used to request the network device to configure or reconfigure at least one gap, and the at least one gap is a gap related to a dual connectivity (DC) state; and a second sending module, configured to send gap configuration information to the terminal, where the gap configuration information is used for the terminal to configure or reconfigure the at least one gap.

According to a fifth aspect, a terminal is provided. The terminal includes a processor, a memory, and a program or an instruction stored in the memory and executable on the processor, where the program or the instruction is executed by the processor to implement steps of the method according to the first aspect.

According to a sixth aspect, a terminal is provided. The terminal includes a processor and a communications interface, where the communications interface is coupled to the processor, and the processor is configured to run a program or an instruction to implement steps of the method according to the first aspect.

According to a seventh aspect, a network device is provided. The network device includes a processor, a memory, and a program or an instruction stored in the memory and executable on the processor, where the program or the instruction is executed by the processor to implement steps of the method according to the second aspect.

According to an eighth aspect, a network device is provided. The network device includes a processor and a communications interface, the communications interface is coupled to the processor, and the processor is configured to run a program or an instruction to implement steps of the method according to the second aspect.

According to a ninth aspect, a readable storage medium is provided. The readable storage medium stores a program or an instruction, and when the program or the instruction is executed by a processor, steps of the method according to the first aspect or steps of the method according to the second aspect are implemented.

According to a tenth aspect, a chip is provided. The chip includes a processor and a communications interface, the communications interface is coupled to the processor, and the processor is configured to run a program or an instruction, to implement steps of the method according to the first aspect or the second aspect.

According to an eleventh aspect, a computer program/program product is provided. The computer program/program product is stored in a non-transitory storage medium, and the program/program product is executed by at least one processor to implement steps of the method according to the first aspect, or steps of the method according to the second aspect.

In the embodiments of this application, the terminal sends a first request to a network device, where the first request is used to request the network device to configure or reconfigure at least one gap, and the at least one gap is a gap related to a DC state; and the terminal receives gap configuration information sent by the network device, where the gap configuration information is used to configure or reconfigure the at least one gap.

DESCRIPTION OF EMBODIMENTS

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that, the terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the description and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. The following descriptions describe a new radio (NR) system for example purposes, and NR terms are used in most of the following descriptions, but these technologies can also be applied to an application other than an NR system application, for example, a 6th generation (6G) communication system.

Figure 1:
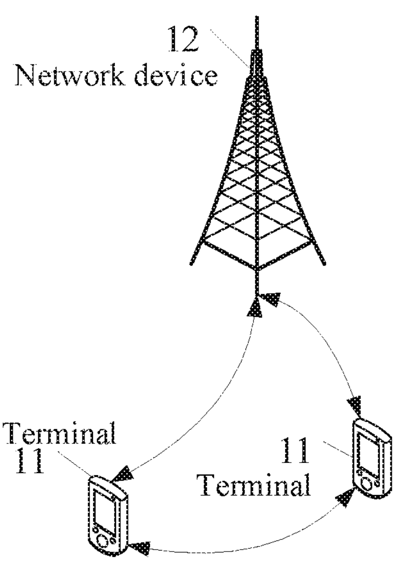
FIG. 1 is a schematic structural diagram of a wireless communications system according to an exemplary embodiment of this application.

FIG. 1 is a schematic structural diagram of a wireless communications system to which an embodiment of this application can be applied. The wireless communications system includes a terminal 11 and a network device 12. The terminal 11 may also be referred to as a terminal device or user equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes a smart watch, a bracelet, a headset, glasses, and the like. It should be noted that a specific type of the terminal 11 is not limited in the embodiments of this application. The network device 12 may be a base station or a core network device. The base station may be referred to as a NodeB, an evolved NodeB (eNB), an access point, a base transceiver station (BTS), a radio base station, a radio transceiver, a basic service set (BSS), an extended service set (ESS), a home NodeB, a home evolved NodeB, a WLAN access point, a Wi-Fi node, a transmitting receiving point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

With reference to the accompanying drawings, the technical solutions provided in the embodiments of this application are described in detail by using some embodiments and application scenarios thereof.

Figure 2:
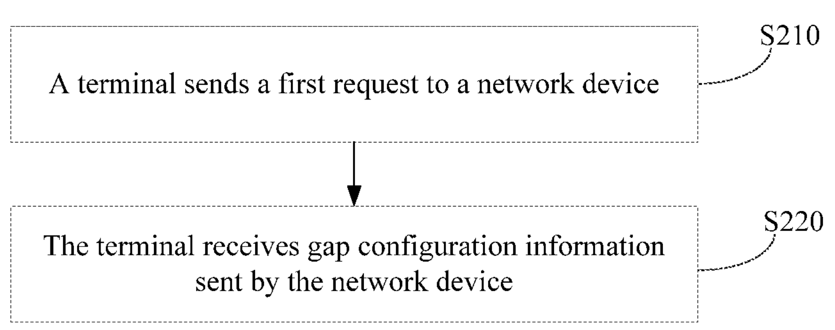
FIG. 2 is a schematic flowchart of a method for configuring gap according to an exemplary embodiment of this application.

FIG. 2 is a schematic flowchart of a method 200 for configuring gap according to an exemplary embodiment of this application. The method 200 may be but is not limited to be executed by a terminal, and specifically, may be executed by hardware and/or software installed in the terminal. In this embodiment, the method 200 may include at least the following steps.

S210. A terminal sends a first request to a network device.

The first request is used to request the network device to configure or reconfigure at least one gap, and the at least one gap is a gap related to a DC state. In this embodiment, "related to a DC state" can be understood as: when the terminal is configured to be in the DC state, the network device is requested, through the first request, to configure at least one gap for the DC state, or when the terminal is not configured to be in the DC state (such as being in a current single connection state), the network device is requested, through the first request, to pre-configure a gap in the DC state. It should be noted that before the terminal is configured to be in a dual connection, the network configures a gap for the terminal, and the configured gap can also be used in the single connection state.

In addition, the gap described in this embodiment may be a multiple subscriber identity module (Multi-SIM) gap or another gap. It can be understood that the terminal requests the network device to configure the gap, so that the terminal is allowed to temporarily not perform a specific operation in the network during the gap, for example, the terminal may not monitor the scheduling of the network during the gap, or may not monitor a channel of the network during the gap. A specific purpose of using the gap by the terminal is not limited in this application. For example, the terminal applies for a gap in a network 1. During the gap, the network 1 allows the terminal not to monitor the scheduling in the network, and during the gap, the terminal may perform a measurement service in the network or perform a service in the network of another card.

In addition, a name of the gap is not limited in this application. For example, the gap may also be referred to as an interval, a departure time, departure duration, a departure interval, a suspension time, suspension duration, a suspension interval, a deactivation time, deactivation duration, a deactivation interval, or the like.

Optionally, if the first request is used to request a plurality of gaps, then the plurality of gaps may be different pieces of time information and different types of gaps, may be same time information and different types of gaps, may be different pieces of time information and a same type of gaps, or the like, which is not limited herein.

In this embodiment, considering whether the terminal is configured to be in the DC state, the network devices receiving the first request may be different. For example, in a case that the terminal is configured to be in the DC state, the network device may include an MN and/or an SN. To be specific, when the terminal is configured to be in the DC state, the terminal may send the first request only to the MN to request the MN to configure or reconfigure at least one gap for the terminal, or send the first request only to the SN to request the SN to configure or reconfigure at least one gap for the terminal, or send the first request to the MN and the SN separately or simultaneously to request the MN and the SN to configure or reconfigure at least one gap for the terminal respectively.

It should be noted that if the terminal sends the first request only to the MN, the MN may determine gap configuration information independently, or the MN may forward the first request or information related to the SN in the first request to the SN, and then the SN may determine the gap configuration information independently, or the MN and the SN may negotiate to determine the gap configuration information.

Alternatively, if the terminal sends the first request only to the SN, the SN may determine gap configuration information independently, or the SN may forward the first request or information related to the MN in the first request to the MN, and then the MN may determine the gap configuration information independently, or the MN and the SN may negotiate to determine the gap configuration information.

Alternatively, if the terminal sends the first request to the MN and the SN, the first request may include information related to both the MN and the SN, or may include only information related to the MN, or may include only information related to the SN, and then the gap configuration information is determined by the MN and the SN through negotiation or independently.

For another example, when the terminal is not configured to be in the DC state, the network node receiving the first request may include a first serving base station (not including the MN or the SN) that provides an access service for the terminal, the gap configuration information is determined by the first serving base station and a second serving base station, and the second serving base station includes at least one candidate SN. It can be understood that when the terminal has not been configured to be in the DC state, the gap configuration information in the DC state, such as configuration information of an MCG gap and configuration information of an SCG gap, can be pre-configured through the first serving base station and/or the second serving base station.

In addition, if there is a candidate SN for the terminal (namely, the second serving base station), the candidate SN may also participate in a gap configuration process. For example, although the terminal has not been configured with the SN, a serving base station (namely, the first serving base station) of the current terminal is ready to configure a candidate SN 1 to the terminal as the SN, the first serving base station of the current terminal may send at least part of information of the first request and/or at least part of information of the gap configuration information determined by the MN to the candidate SN before sending the gap configuration information to the terminal, and the candidate SN 1 can determine appropriate gap configuration information, such as determining the SCG gap. In an implementation, when the terminal sends the first request to the network device, the network device may indicate to the terminal whether to allow the terminal to send the first request through a broadcast message or dedicated signalling.

It should be noted that the first request mentioned in this application may be sent through radio resource control (RRC), a medium access control-control element (MAC CE), or uplink control information (UCI); and subsequent gap configuration information may be sent through RRC, an MAC CE, or downlink control information (DCI), which is not limited in this application.

S220. The terminal receives the gap configuration information sent by the network device.

The gap configuration information is used for the terminal to configure or reconfigure the at least one gap in the DC state.

In an implementation, after receiving the gap configuration information sent by the network device, the terminal may send the first request to the network device again, so that if the gap configuration information sent by the network device does not meet a gap requirement of the terminal or the gap requirement of the terminal changes, the terminal may request the network device to adjust the gap configuration to meet the gap requirement of the terminal by sending the first request again.

In this embodiment, by fully considering whether the terminal is configured to be in the DC state and then requesting the gap configuration from the corresponding network device, on the one hand, a flexible gap configuration can be realized based on the DC state, and on the other hand, the terminal may directly request the gap of the MCG from the MN and the gap of the SCG from the SN without negotiation and information exchange between the MN and the SN. This avoids the problem of transferring gap configuration related information between network interfaces, reduces an application/configuration delay of the gap and system signalling overheads, and effectively improves communication performance of the terminal in the DC state (or architecture).

Figure 3:
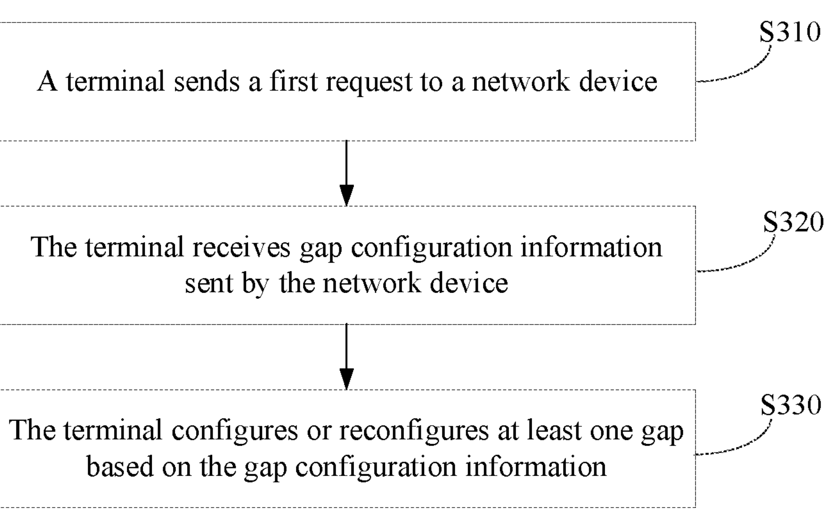
FIG. 3 is a schematic flowchart of a method for configuring gap according to another exemplary embodiment of this application.

FIG. 3 is a schematic flowchart of a method 300 for configuring gap according to an exemplary embodiment of this application. The method 300 may be but is not limited to be executed by a terminal, and specifically, may be executed by hardware and/or software installed in the terminal. In this embodiment, the method 300 may include at least the following steps.

S310. A terminal sends a first request to a network device.

The first request is used to request the network device to configure or reconfigure at least one gap, and the at least one gap is a gap related to a DC state.

It should be noted that as for an implementation process of S310, in addition to referring to the related descriptions in the method embodiment 200, in a possible implementation, the first request may carry at least one of the following (1) to (8).

(1) Gap identifier.

The gap identifier may be explicitly or implicitly carried in the first request, for example, the gap identifier may be implicitly indicated based on duration of the gap from high to low. For example, the terminal requests three gaps, and durations of gaps are 80, 40, and 20, respectively. The identifiers of the three gaps are sorted based on the gap duration, and an appearance order of the three gaps indicates a first, second, and third identifier. If the terminal requests to use a first gap, it means to use the gap with duration of 80.

In addition, if the first request is used to apply for a gap configuration, the first request may not carry a gap identifier, and if the first request is used to apply for a plurality of gap configurations, the first request may carry a gap identifier to distinguish a plurality of different gaps.

(2) Gap type.

The gap type includes at least one of per UE gap, per frequency range (per Frequency range, per FR) gap, an FR 1 gap, an FR 2 gap, per cell group (per CG) gap, an MCG gap, an SCG gap, a periodic gap, one shot gap, per direction gap, an uplink (UL) gap, and a downlink (DL) gap.

In this embodiment, some gap types can be configured through protocol agreement or network configuration. For example, if the terminal applies for the per FR gap, the network device may consider by default that the type of per FR gap applied by the terminal includes UL gap and DL gap; and for another example, if the first request is sent in a cell group A, and the gap type is one shot gap, the network device may consider by default that a type of the applied gap is the gap of the cell group A.

In other embodiments, the gap type may also be per carrier gap, per bandwidth part (BWP) gap, per serving cell gap, or another granularity of gap, which is not limited in this application.

(3) Gap-related time information.

The gap-related time information includes at least one of a gap length, a gap period, a gap start time, a gap end time, and a gap scale factor. In this embodiment, different gaps may have same or different time information, such as a gap length, a gap period, a gap start time, a gap end time, and the like.

In an implementation, the gap-related time information may also include one gap scale factor. The gap scale factor is used to segment the at least one gap. For example, the terminal sends the first request to request to allocate at least one gap, indicating that one scale factor is 1, and then the network configures the gap for the terminal. If the terminal operates in a single connection state, the scale factor is not used. If the terminal operates in a dual connection state, the terminal determines that the MCG gap and the SCG gap are a first half gap and a second half gap of the configured gap respectively based on the configured gap duration and the scale factor.

In addition, the gap scale factor may be a specific value agreed by the protocol or configured by the network, or an index value or a number value of a specific mapping relationship, which is not limited.

(4) First indication information for indicating a request type of the first request, where the request type includes at least one of adding a gap configuration, modifying a gap configuration, and releasing a gap configuration. The adding a gap configuration can also be understood as configuring or adding a gap, the modifying a gap configuration can also be understood as reconfiguring a gap, and releasing a gap configuration can be understood as deleting or canceling a gap.

(5) Second indication information for requesting enabling or disabling at least one gap.

For example, the terminal can be instructed to perform an enabling (which can also be understood as requesting to use, including using the configured gap or using the gap immediately after being configured) or disabling (which can also be understood as not using, including not using immediately or stopping using the configured gap after being configured) operation through one bit of indication information.

For another example, the second indication information may also be a number of bits, indicating the gap identifier, that is, indicating the gap identifier corresponding to the gap to be enabled or disabled.

For another example, the second indication information may also indicate the gap type, that is, indicate the gap type corresponding to the gap to be enabled or disabled.

(6) Third indication information for indicating that the terminal returns to a network in advance during the gap.

In an implementation, in addition to indicating that the terminal returns to a network in advance during the gap, the third indication information can indicate that the terminal can monitor the channel or the network scheduling during the gap, or the terminal requests network scheduling or dynamically indicates the gap end time of the terminal, or the like, which is not limited herein.

(7) Fourth indication information for indicating that the terminal requests to reconfigure the gap during the gap, or the terminal requests to switch the gap during the gap.

In an implementation, it is assumed that the gap currently being used by the terminal is a gap A, the terminal may indicate, through the fourth indication information, that it needs to reconfigure the gap A during the gap A or request to switch from the gap A to a gap B.

The gap A or the gap B can be a periodic gap, one shot gap, or the like.

(8) Fifth indication information for indicating a DC-related working mode of the terminal during the gap.

The working mode may include an uplink power sharing mode, being in a DC state, not being in a DC state, and the like.

For example, the fifth indication information may indicate an uplink power sharing mode that is requested to be configured when the terminal is configured to be in the DC state; and for another example, the fifth indication information may indicate, in a case that the terminal is not configured to be in the DC state, whether the gap that is requested to be configured in the first request can be used in a case that the terminal is configured to be in the DC state. For another example, the fifth indication information may also be used to indicate whether the terminal expects to be configured to be in the DC state.

On the basis of the foregoing contents, in order to improve efficiency and reliability of the gap configuration, as a possible implementation in this embodiment, the terminal may send the first request to the MN when the network device includes the MN and satisfies at least one of the following (1) to (8).

(1) The first request is used to request to configure or reconfigure per UE gap.

Per UE gap can be understood as that the gap type requested in the first request is at least a gap of the per UE type, and it can be understood that the per UE gap can also be a periodic gap type or a one shot gap type, or another gap type, which is not limited in this application in case of no contradiction, which will not be described in detail in the following.

(2) The first request is used to request to configure or reconfigure an FR 1 gap.

In an implementation, the terminal may send the first request to the MN in a case that the terminal is configured with intra-FR 1 DC, and the first request is used to request to configure or reconfigure the FR 1 gap. "intra-FR 1 DC" can operate on FR 1 for both the MCG and the MCG immediately.

In another implementation, the terminal may also send the first request to the MN in a case that the terminal is configured with the MCG FR 1 and the SCG FR 2, and the first request is used to request to configure or reconfigure the FR 1 gap. "MCG FR 1 and SCG FR 2" can be understood as that the MCG operates on the FR 1, and the SCG operates on the FR 2. (3) The first request is used to request to configure or reconfigure an FR 2 gap.

In an implementation, the terminal may send the first request to the MN in a case that the terminal is configured with intra-FR 2 DC, and the first request is used to request to configure or reconfigure the FR 2 gap.

In another implementation, the terminal may also send the first request to the MN in a case that the terminal is configured with the MCG FR 2 and the SCG FR 1, and the first request is used to request to configure or reconfigure the FR 2 gap. (4) The first request is used to request to configure or reconfigure an MCG gap.

In an implementation, the terminal may send the first request to the MN in a case that the network device indicates supporting the configuration of MCG gap, and the first request is used to request to configure or reconfigure the MCG gap.

(5) The first request is used to request, when no SN is added, to configure an SCG gap.

"No SN is added" can be understood as: the terminal has not been configured to be in the DC state, but the SCG gap needs to be configured in advance.

(6) The terminal has performed condition handover (CHO).

In an implementation, when the terminal is configured with the MCG gap and/or the SCG gap, the terminal performs condition handover when CHO execution conditions are met, that is, being switched to the target MN, and a gap requirement of the MCG gap and/or the SCG gap may change, then the terminal may send the first request to the target MN during switch.

(7) The first request is used to request the terminal to return to a network in advance during the gap.

"Return to a network in advance" can be understood as: the terminal can return to the network in advance when the gap end time or duration of the gap does not arrive. "Return to a network" can be understood as staying in this network, or being able to monitor scheduling in this network, or being able to send and receive in this network, or being able to monitor a channel in this network, or the like.

In an implementation, the first request may be used to indicate that at least a remaining time of the current gap expires or at least a remaining time of the current gap is cancelled.

In another implementation, the first request may also be used to dynamically indicate the gap end time. For example, if the network is configured with a long gap, a time when the terminal sends the first request or a time when a network side receives the first request or a time indicated in the first request indicates the gap end time.

(8) The first request is used to request the terminal to reconfigure or switch the gap during the gap.

In an implementation, it is assumed that the gap currently being used by the terminal is a gap A, the terminal may indicate, through the fourth indication information, that it needs to reconfigure the gap A during the gap A or request to switch from the gap A to a gap B.

Based on this, when the terminal sends the first request to the MN, the first request may be sent to the MN through the MCG; or/and the first request may be sent to the MN through a split signalling radio bearer (SRB) 1 or SRB 3. For example, in MCG RLF, the UE may carry the first request when sending MCG failure information to the MN through the split SRB 1 or SRB 3.

In addition, as another possible implementation in this embodiment, the terminal may send the first request to the SN when the network device includes the SN and satisfies at least one of the following (1) to (6).

(1) The first request is used to request to configure or reconfigure an SCG gap.

(2) The first request is used to request to configure or reconfigure an FR 1 gap in a case that the terminal is configured with an MCG FR 2 and an SCG FR 1.

"MCG FR 2 and SCG FR 1" can be understood as follows: when the terminal is configured with the DC state, the MCG operates in the FR 2, and the SCG operates in the FR 1.

(3) The first request is used to request to configure or reconfigure an FR 2 gap in a case that the terminal is configured with an MCG FR 1 and an SCG FR 2.

"MCG FR 1 and SCG FR 2" can be understood as follows: when the terminal is configured with the DC state, the MCG operates in the FR 1, and the SCG operates in the FR 2.

(4) The terminal has performed conditional PSCell change (Conditional PSCell change, CPC).

In an implementation, when the UE is configured with the MCG gap and/or the SCG gap, the terminal performs condition handover when CPC execution conditions are met, that is, being switched to the target SN, and a gap requirement of the MCG gap and/or the SCG gap may change, then the UE may send the first request to the target SN during a CPC execution process.

(5) During the gap configured by the SN, the terminal needs to return to the network in advance.

(6) During the gap configured by the SN, the terminal requests to reconfigure the gap or switch the gap.

Based on this, when the terminal sends the first request to the SN, it can be realized by any one of the following manners 1 to 3.

Manner 1: in a case that the terminal is configured with a split SRB 1 or SRB 3, and an SCG in which the terminal is located is in an active state, the terminal sends the first request to the SN by using the split SRB 1 or SRB 3.

Manner 2: in a case that the terminal is configured with the split SRB 1 or SRB 3, but the SCG is in an inactive state, the terminal sends the first request to the SN by using the MCG.

Manner 3: in a case that the terminal is not configured with the split SRB 1 or SRB 3, the terminal sends the first request to the SN by using the MCG.

Further, it is considered that based on different network devices, after receiving the first request sent by the terminal, the network device (such as the MN, the SN, or the serving base station) can determine the gap configuration information independently, or determine the gap configuration information through mutual negotiation (such as the MN and the SN).

For example, if the network device includes the MN, the MN sends at least one of the following (1) to (5) to the SN in a case that the SN needs to determine the gap configuration information or the MN and the SN need to negotiate to determine the gap configuration information.

(1) At least part of information carried in the first request. For example, only the gap request information related to the SN in the first request can be sent, or all the information carried in the first request can be sent to the SN.

(2) At least part of information in the gap configuration information configured by the MN. For example, the at least part of the information may be gap configuration information indicating only the periodic gap in the gap configuration information.

(3) At least part of information in gap configuration information configured by a source SN in a case that the SN is a switched target SN.

(4) At least part of information in a first request received by the source SN in a case that the SN is a switched target SN.

(5) Configuration information of a gap that the terminal requests to use or configuration information of a gap that the terminal is using.

For another example, if the network device includes the SN, the SN sends at least one of the following (1) to (3) to the MN in a case that the MN needs to determine the gap configuration information or the SN and the MN need to negotiate to determine the gap configuration information.

(1) At least part of information carried in the first request.

(2) At least part of information in gap configuration information configured by the SN.

(3) Configuration information of a gap that the terminal requests to use or configuration information of a gap that the terminal is using.

For another example, if the network device includes a first serving base station, the first serving base station sends at least one of the following (1) to (3) to the second serving base station in a case that the second serving base station needs to determine the gap configuration information or the first serving base station and the second serving base station need to negotiate to determine the gap configuration information.

(1) At least part of information carried in the first request.

(2) At least part of information in gap configuration information configured by the first serving base station.

(3) Configuration information of a gap that the terminal requests to use or configuration information of a gap that the terminal is using.

In addition, as a possible implementation, the terminal may send the first request to the network device after receiving the indication information sent by the network device, where the indication information is used to indicate that the network device supports the terminal in applying for a gap, such as supporting the terminal in applying for the MCG gap, the SCG gap, the periodic gap, per UE gap, and the like, thereby ensuring reliability of the gap configuration.

S320. The terminal receives the gap configuration information sent by the network device.

The gap configuration information is used to configure or reconfigure the at least one gap.

It should be noted that as for an implementation process of S310, in addition to referring to the related descriptions in the method embodiment 200, in a possible implementation, the gap configuration information may be sent to the terminal by the network device through the MCG SRB 1 or SRB 3 or split SRB 1. Certainly, in this embodiment, the gap configuration information may include at least one of the following (1) to (7).

(1) Gap identifier.

(2) Gap type.

(3) Gap-related time information.

(4) Sixth indication information for indicating enabling or disabling at least one gap configuration.

(5) Seventh indication information for indicating that the terminal releases at least one gap configuration.

(6) Eighth indication information for indicating a DC-related working mode during the gap.

(7) Ninth indication information for indicating that the terminal switches the gap.

For the descriptions of (1) to (7) that may be included in the gap configuration information, please refer to the above descriptions of the first request. To avoid repetition, details are not described herein again. The ninth indication information can be only 1-bit information, indicating to switch the gap, then the terminal is switched to a default gap at this time; or the ninth indication information may be several bits, indicating an identifier of a switched target gap.

Considering that the gap configuration information is used for the terminal to configure a gap in a DC state, as a possible implementation, at least one of the following (1) to (9) included in the gap configuration information can be determined by the MN.

(1) Configuration of per UE gap.

(2) Configuration of per FR gap.

(3) Configuration of the FR 1 gap in a case that the terminal is configured with intra-FR 1 DC.

"intra-FR 1 DC" can be understood as follows: when the terminal is configured to be in the DC state, both the MCG and the SCG have a serving cell operating in FR 1.

(4) Configuration of the FR 2 gap in a case that the terminal is configured with intra-FR 2 DC.

"intra-FR 2 DC" can be understood as follows: when the terminal is configured to be in the DC state, both the MCG and the SCG have a serving cell operating in FR 2.

Intra-FR 1 DC and intra-FR 2 DC can coexist, and in this case, the terminal may apply for per FR gap.

(5) Configuration of the FR 1 gap in a case that the terminal is configured with an MCG FR 1 and an SCG FR 2.

(6) Configuration of the FR 2 gap in a case that the terminal is configured with an MCG FR 2 and an SCG FR 1.

(7) Configuration of the MCG gap.

(8) Configuration of one shot gap requested from the MN.

(9) Configuration of the periodic gap requested from the MN.

Correspondingly, at least one of the following (1) to (5) included in the gap configuration information is determined by the SN.

(1) Configuration of the FR 1 gap in a case that the terminal is configured with an MCG FR 2 and an SCG FR 1.

(2) Configuration of the FR 2 gap in a case that the terminal is configured with an MCG FR 1 and an SCG FR 2.

(3) Configuration of the SCG gap.

(4) Configuration of one shot gap requested from the SN.

(5) Configuration of the periodic gap requested from the SN.

S330. The terminal configures or reconfigures at least one gap based on the gap configuration information.

As a possible implementation, the process of configuring the gap by the terminal based on the gap configuration information may include: determining, based on the gap configuration information, a time unit where a start time or an end time of the gap is located, where the time unit includes at least one of a system frame number (SFN), a subframe position, a slot position, and a symbol position.

For example, if the network device configures two start time parameters in the gap configuration information, such as radio frame number information and subframe information, which can be expressed as $T_{startSFN}/T_{startSubframe}$, where $T_{startSFN}$ is related to a start wireless frame and $T_{startSubframe}$ is the start subframe position in $T_{startSFN}$. Then, the terminal may set the SFN where the gap start time is located and a corresponding subframe in the SFN as $T_{startSFN}$ mod 1024 (or $T_{startSFN}$) and $T_{startSubframe}$ respectively.

For another example, if the network device configures a start time parameter in the gap configuration information, such as $T_{start}$, the UE sets the SFN where the gap start time is located and a corresponding subframe in the SFN as SFN=$T_{startSFN}/10$ and $T_{startSubframe}$ mod 10 respectively.

For another example, for a periodic gap, if the network device configures a start time parameter $T_{start}$ and a period parameter $T_{period}$ in the gap configuration information, then the terminal may set the SFN where the gap start time is located and a corresponding subframe in the SFN as SFN mod ($T_{period}/10$)=FLOOR ($T_{startSFN}/10$) and $T_{startSubframe}$ mod 10 respectively.

For another example, if the terminal is configured with the MCG gap and the SCG gap, it is determined, based on a time difference (for example, SFTD, SFN timingdifference) between the MCG and the SCG or a time difference between PCell and PSCell, a time unit where a start time or an end time of the MCG gap or the SCG gap is located. For example, if the terminal calculates that the SFN where the gap start time of the MCG gap is located and the corresponding subframe in the SFN are $T_{startSFNMCG}$ and $T_{startSubframeMCG}$ respectively, the SFN where the gap start time of the SCG gap is located and a corresponding subframe in the SFN are $T_{startSFNSCG}=T_{startSubframeMCG}+S_{fnOffset}$ and $T_{startSubframeSCG}=T_{startSubframeMCG}$+subframeOffset respectively. sfnOffset and subframeOffset are an SFN offset and a subframe time domain offset between the MCG and the SCG.

Based on the foregoing descriptions, the gap configuration process provided in this embodiment will be further described below with reference to Example 1 to Example 3.

Example 1

It is assumed that the terminal needs to apply for the periodic gap from the network device, such as an MCG periodic gap and an SCG periodic gap, then:

S11: When receiving the first indication information sent by the MN, the terminal sends the first request to the MN through the MCG to request the MN to configure (or allocate) the MCG periodic gap; and indicates that the terminal may apply for the MCG periodic gap from the MN.

S12: When receiving the second indication information sent by the SN, the terminal sends the first request to the SN through SRB 3 to request the SN to configure the SCG periodic gap, and the second indication information is used to indicate that the terminal may apply for the SCG periodic gap from the SN.

S13: The terminal receives MCG periodic gap configuration information from the MN and receives SCG periodic gap configuration information from the SN.

Before or after the terminal receives the MCG periodic gap configuration information/the SCG periodic gap configuration information, the MN may send the MCG periodic gap configuration to the SN, and the SN sends the SCG periodic gap configuration to the MN.

S14: The terminal sends the first request to the MN to request to modify the MCG periodic gap configuration.

S15: The terminal receives updated MCG periodic gap configuration information from the MN, and the MN may send the updated MCG periodic gap configuration to the SN before or after the terminal receives the updated MCG periodic gap configuration information.

Example 2

It is assumed that the terminal needs to apply for per UE gap from the network device, then:

S21: When receiving the first indication information sent by the MN, the terminal sends the first request to the MN to request the MN to allocate per UE gap, and the first indication information is used to indicate that the terminal may apply for per UE gap.

S22: The terminal receives per UE gap configuration information from the MN.

Optionally, in the process of configuring per UE gap for the terminal by the network device, the MN sends the first request and/or per UE gap configuration information to the SN. In addition, the MN may also receive a response to the first request sent by the SN, for example, SN preference on per UE gap.

S23: The terminal sends the first request to the MN again, requesting to modify per UE gap configuration.

S24: The terminal receives updated per UE gap configuration information from the MN.

Optionally, before or after the terminal receives the updated per UE gap configuration, the MN may send the updated per UE gap configuration information to the SN.

Example 3

It is assumed that the terminal needs to apply for per UE gap from the network device during per CG gap, then:

S31: An SN of a network A configures an SCG gap for the terminal.

S32: During the SCG gap, the terminal goes to a network B to monitor paging and receives a paging message.

S33: The terminal sends the first request to an MN of the network A during SCG gap to apply for configuring per UE gap.

Optionally, deactivation or release of SCG gap is indicated. Correspondingly, the MN may also indicate to the SN that the terminal currently deactivates or releases the SCG gap.

S34: The terminal receives per UE gap configuration information configured by the network device.

S35: During per UE gap, the terminal sends a busy indication in the network B.

In this embodiment, by fully considering whether the terminal is configured to be in the DC state, not only flexibility of gap application/configuration is improved, but also the granularity of gap can be refined (such as per UE gap, per FR gap, FR 1 gap, FR 2 gap, per CG gap, MCG gap, SCG gap, periodic gap), and the communication performance of the UE in the DC state is further ensured.

Figure 4:
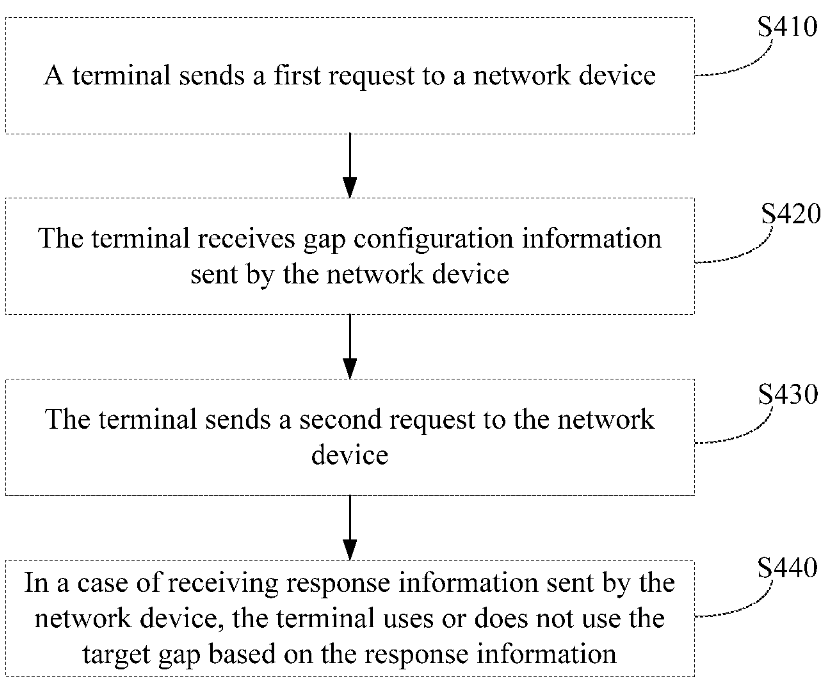
FIG. 4 is a schematic flowchart of a method for configuring gap according to another exemplary embodiment of this application.

FIG. 4 is a schematic flowchart of a method 400 for configuring gap according to an exemplary embodiment of this application. The method 400 may be but is not limited to be executed by a terminal, and specifically, may be executed by hardware and/or software installed in the terminal. In this embodiment, the method 400 may include at least the following steps.

S410. A terminal sends a first request to a network device.

The first request is used to request the network device to configure or reconfigure at least one gap, and the at least one gap is a gap related to a DC state.

S420. The terminal receives the gap configuration information sent by the network device.

The gap configuration information is used to configure or reconfigure the at least one gap.

It should be noted that for implementation processes in S410 to S420, refer to the related descriptions in the method embodiments 200 and/or 300. To avoid repetition, details are not described herein again.

S430. The terminal sends a second request to the network device.

The second request is used to request the network device to use a target gap, and the target gap is at least one configured gap.

The second request includes at least one of the following (1) to (3).

(1) An identifier of the target gap.

The identifier of the target gap may be indicated in an implicit or explicit way.

(2) Type of the target gap.

The type of the target gap may be at least one of per UE gap, per FR gap, FR 1 gap, FR 2 gap, per CG gap, MCG gap, SCG gap, periodic gap, one shot gap, per direction gap, UL gap, and DL gap.

(3) Time domain offset that needs to be used in a start time of the target gap.

In this embodiment, similar to sending the first request, the terminal may also send a second request to the MN and/or the SN, and then the MN and/or the SN may determine whether to allow the terminal to use the target gap.

In a possible implementation, the terminal may send the second request to the MN when the network device includes the MN and satisfies at least one of the following (1) to (5).

(1) The target gap is a gap configured by the MN.

(2) The target gap is an MCG-related gap.

(3) The target gap is a gap configured by the SN, but the SCG is in a deactivated state.

It can be understood that although the terminal can perform an MSIM task without the gap when the gap is on the SCG and the SCG is in the deactivated state, considering that the SN does not know whether the terminal uses the gap, in order to ensure reliability of data transmission, if downlink data reaches the SN, the SN needs to initiate an SCG activation process.

(4) The terminal needs to return to the network in advance during the target gap.

(5) Request to use another gap, or be switched to another gap during the target gap, where the another gap is a gap in at least one gap other than the target gap.

It is assumed that the target gap is per CG gap, during per CG gap, the terminal may initiate per CG gap, for example, per CG gap is used to receive paging, as a result, the paging is received, and per UE gap is applied to send busy indication.

In another implementation, the terminal may send the second request to the SN when the network device includes the SN and satisfies at least one of the following (1) to (4).

(1) The target gap is a gap configured by the SN.

(2) The target gap is an SCG-related gap.

For example, the target gap is a gap configured by the MN, but the target gap is an SCG-related gap.

(3) The target gap is a gap configured by the MN or an MCG-related gap, but the MCG is in an unreachable state.

When the MCG is in an unreachable state, it can be understood that an MCG wireless link fails.

(4) The terminal returns to the network in advance during the target gap.

(5) Request to use another gap, or be switched to another gap during the target gap, where the another gap is a gap in at least one gap other than the target gap.

In addition, the second request described in this embodiment may be sent through MAC CE or RRC or UCI. In an implementation, if the terminal is configured with SRB 3 or split SRB 1, and the SCG is in an active state, the terminal may send the second request to the SN.

S440. In a case of receiving the response information sent by the network device, the terminal uses or does not use the target gap based on the response information.

It should be noted that in the foregoing embodiments, if the first request and the second request are sent by the terminal during the gap, then the first request or the second request may be random access, a scheduling request (SR), a buffer status report (BSR), uplink data, or uplink signalling initiated by the terminal, which is not limited herein.

Based on the foregoing descriptions, the gap configuration process provided in this embodiment will be described below with reference to Example 1 to Example 2.

Example 1

It is assumed that the terminal needs to apply for one shot gap from the network device, such as an MCG one shot gap and an SCG one shot gap, then:

S11: When receiving the first indication information sent by the MN, the terminal sends the first request to the MN through the MCG, requesting the MN to allocate the MCG one shot gap, where the first indication information is used to indicate that the terminal may apply for the MCG one shot gap from the MN.

S12: When receiving the second indication information sent by the SN, the terminal sends the first request to the SN through the SRB 3, requesting the SN to allocate the SCG one shot gap, where the second indication information is used to indicate that the terminal may apply for the SCG one shot gap from the SN.

S13: The terminal receives MCG one shot gap configuration information from the MN and receives SCG one shot gap configuration information from the SN.

S14: The terminal sends the second request to the SN, requesting to use the SCG one shot gap.

S15: The terminal uses the SCG one shot gap to perform a service on a network of another card.

S16: If the terminal returns to the network in advance while the SCG one shot gap is running, the terminal may perform one of the following (1) to (6).

(1) Initiate random access to the SN.

(2) Send an SR to the SN.

(3) Send a BSR to the SN.

(4) Send uplink data to the SN.

(5) Send another unlink signalling to the SN.

(6) Send a return notification to the MN.

Example 2

It is assumed that the terminal needs to apply for per UE gap from the network device during per CG gap, then:

S21: An SN of a network A configures an SCG gap for the terminal.

S22: During the SCG gap, the terminal goes to a network B to monitor paging and receives a paging message.

S23: The terminal sends the second request to an MN of the network A during SCG gap to apply for using the configured per UE gap.

Optionally, deactivation or release of SCG gap is indicated. Correspondingly, the MN may also indicate to the SN that the terminal currently deactivates or releases the SCG gap.

In this embodiment, in a case of applying for gap configuration information from the network device through the first request, the network device is further requested to use the target gap through the second request, thus, on the basis of improving the flexibility of gap configuration, synchronization of transmitting and receiving states between the terminal and the network device can be maintained, and data scheduled by a specific node can be prevented from being lost when the terminal is switched to another network to perform the service.

Figure 5:
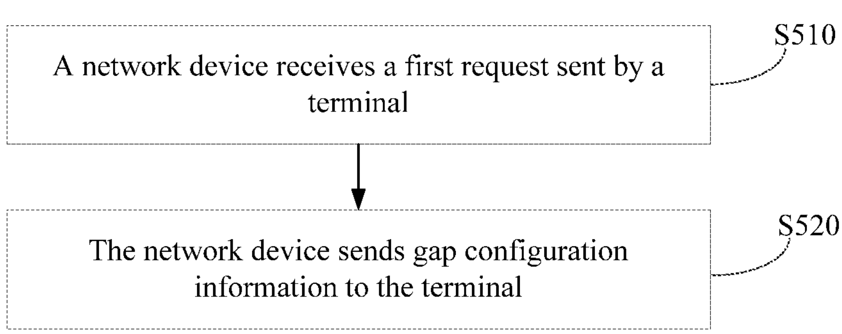
FIG. 5 is a schematic flowchart of a method for configuring gap according to another exemplary embodiment of this application.

FIG. 5 is a schematic flowchart of a method 500 for configuring gap according to an exemplary embodiment of this application. The method 500 may be but is not limited to be executed by a network device, and specifically, may be executed by hardware and/or software installed in the network device. In this embodiment, the method 500 may include at least the following steps.

S510. A network device receives a first request sent by a terminal, where the first request is used to request the network device to configure or reconfigure at least one gap, and the at least one gap is a gap related to a DC state.

S520. The network device sends the gap configuration information to the terminal.

The gap configuration information is used for the terminal to configure or reconfigure the at least one gap. In a possible implementation, when the terminal is configured to be in the DC state, the network device includes a master node (MN) or a secondary node (SN), and the gap configuration information is determined by the MN and/or the SN; and when the terminal is not configured to be in the DC state, the network node includes a first serving base station that provides an access service for the terminal, the gap configuration information is determined by the first serving base station and/or a second serving base station, and the second serving base station includes at least one candidate SN.

In another possible implementation, the first request carries at least one of the following: a gap identifier; a gap type; gap-related time information; first indication information for indicating a request type of the first request, where the request type includes at least one of adding a gap configuration, modifying a gap configuration, and releasing a gap configuration; second indication information for requesting enabling or disabling at least one gap; third indication information for indicating that the terminal returns to a network in advance during the gap; fourth indication information for indicating that the terminal requests to reconfigure the gap during the gap, or the terminal requests to switch the gap during the gap; and fifth indication information for indicating a dual connectivity (DC)-related working mode of the terminal during the gap.

In another possible implementation, the gap type includes at least one of the following: per UE gap, per FR gap, an FR 1 gap, an FR 2 gap, per CG gap, an MCG gap, an SCG gap, a periodic gap, one shot gap, per direction gap, a UL gap, and a DL gap.

In another possible implementation, the gap-related time information includes at least one of a gap length, a gap period, a gap start time, a gap end time, and a gap scale factor.

In another possible implementation, the gap configuration information includes at least one of the following: a gap identifier; a gap type; gap-related time information; sixth indication information for indicating enabling or disabling at least one gap configuration; seventh indication information for indicating that the terminal releases at least one gap configuration; eighth indication information for indicating a DC-related working mode during the gap; and ninth indication information for indicating that the terminal switches the gap.

In another possible implementation, at least one of the following included in the gap configuration information is determined by the MN: a configuration of per UE gap; a configuration of per FR gap; a configuration of the FR 1 gap in a case that the terminal is configured with intra-FR 1 DC; a configuration of the FR 2 gap in a case that the terminal is configured with intra-FR 2 DC; a configuration of the FR 1 gap in a case that the terminal is configured with an MCG FR 1 and an SCG FR 2; a configuration of the FR 2 gap in a case that the terminal is configured with an MCG FR 2 and an SCG FR 1; a configuration of the MCG gap; a configuration of one shot gap requested from the MN; and a configuration of the periodic gap requested from the MN.

In another possible implementation, at least one of the following included in the gap configuration information is determined by the SN: a configuration of the FR 1 gap in a case that the terminal is configured with an MCG FR 2 and an SCG FR 1; a configuration of the FR 2 gap in a case that the terminal is configured with an MCG FR 1 and an SCG FR 2; a configuration of the SCG gap; a configuration of one shot gap requested from the SN; and a configuration of the periodic gap requested from the SN.

In another possible implementation, the MN sends at least one of the following to the SN: at least part of information carried in the first request; at least part of information in gap configuration information configured by the MN; at least part of information in gap configuration information configured by a source SN in a case that the SN is a switched target SN; at least part of information in a first request received by the source SN in a case that the SN is a switched target SN; and configuration information of a gap that the terminal requests to use or configuration information of a gap that the terminal is using.

In another possible implementation, the SN sends at least one of the following to the MN: at least part of information carried in the first request; at least part of information in gap configuration information configured by the SN; and configuration information of a gap that the terminal requests to use or configuration information of a gap that the terminal is using.

In another possible implementation, the method further includes: receiving, by the network device, a second request sent by the terminal, where the second request is used to request the network device to use a target gap, and the target gap belongs to the at least one gap; and sending, by the network device, response information to the terminal, where the response information is used to instruct the terminal to use or not use the target gap.

In another possible implementation, the second request includes at least one of the following: an identifier of the target gap; a type of the target gap; and a time domain offset that needs to be used in a start time of the target gap.

It should be noted that, for the implementation process of the implementations provided in this embodiment, refer to the relevant descriptions in the method embodiments 200 to 400. To avoid repetition, details are not described in this embodiment.

In this embodiment, by fully considering whether the terminal is configured to be in the DC state and then requesting the gap configuration from the corresponding network device, a flexible gap configuration can be realized based on the DC state, and this avoids the problem of transferring gap configuration related information between network interfaces, reduces an application/configuration delay of the gap and system signalling overheads, and improves communication performance of the UE in the DC state (or architecture).

It should be noted that the methods 200 to 500 for configuring gap provided in the embodiments of this application may be executed by an apparatus for configuring gap, or a control module in the apparatus for configuring gap for executing the methods 200 to 500 for configuring gap. In this embodiment of this application, an example in which the methods 200 to 500 for configuring gap are implemented by the apparatus for configuring gap is used to describe the apparatus for configuring gap provided in this embodiment of this application.

Figure 6:
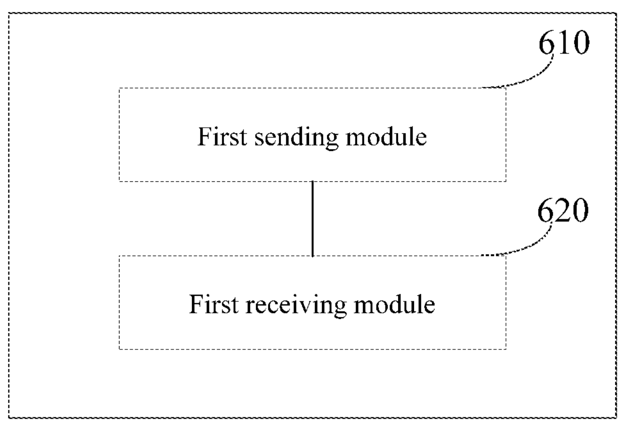
FIG. 6 is a schematic structural diagram of an apparatus for configuring gap according to an exemplary embodiment of this application.

FIG. 6 is a structural schematic diagram of an apparatus 600 for configuring gap according to an exemplary embodiment of this application, the apparatus 600 is applied to a terminal, and the apparatus 600 includes: a first sending module 610, configured to send a first request to a network device, where the first request is used to request the network device to configure or reconfigure at least one gap, and the at least one gap is a gap related to a DC state; and a first receiving module 620, configured to receive gap configuration information sent by the network device, where the gap configuration information is used to configure or reconfigure the at least one gap.

In a possible implementation, when the terminal is configured to be in the DC state, the network device includes an MN and/or an SN, and the gap configuration information is determined by the MN and/or the SN; and when the terminal is not configured to be in the DC state, the network node includes a first serving base station that provides an access service for the terminal, the gap configuration information is determined by the first serving base station and/or a second serving base station, and the second serving base station includes at least one candidate SN.

In another possible implementation, the first request carries at least one of the following: a gap identifier; a gap type; gap-related time information; first indication information for indicating a request type of the first request, where the request type includes at least one of adding a gap configuration, modifying a gap configuration, and releasing a gap configuration; second indication information for requesting enabling or disabling at least one gap; third indication information for indicating that the terminal returns to a network in advance during the gap; fourth indication information for indicating that the terminal requests to reconfigure the gap during the gap, or the terminal requests to switch the gap during the gap; and fifth indication information for indicating a dual connectivity (DC)-related working mode of the terminal during the gap.

In another possible implementation, the gap type includes at least one of the following: per UE gap, per FR gap, an FR 1 gap, an FR 2 gap, per CG gap, an MCG gap, an SCG gap, a periodic gap, one shot gap, per direction gap, a UL gap, and a DL gap.

In another possible implementation, the gap-related time information includes at least one of a gap length, a gap period, a gap start time, a gap end time, and a gap scale factor.

In another possible implementation, the first sending module 610 sends the first request to the MN in a case that at least one of the following is satisfied: the first request is used to request to configure or reconfigure per UE gap; the first request is used to request to configure or reconfigure an FR 1 gap; the first request is used to request to configure or reconfigure an FR 2 gap; the first request is used to request to configure or reconfigure an MCG gap; the first request is used to request, when no SN is added, to configure an SCG gap; the terminal has performed condition handover (CHO); the first request is used to request the terminal to return to a network in advance during the gap; and the first request is used to request the terminal to reconfigure or switch the gap during the gap.

In another possible implementation, the first sending module 610 sends the first request to the MN through the MCG; or/and the first request is sent to the MN through a split signalling radio bearer (SRB) 1 or SRB 3.

In another possible implementation, the first sending module 610 sends the first request to the SN in a case that at least one of the following is satisfied: the first request is used to request to configure or reconfigure an SCG gap; the first request is used to request to configure or reconfigure an FR 1 gap in a case that the terminal is configured with an MCG FR 2 and an SCG FR 1; the first request is used to request to configure or reconfigure an FR 2 gap in a case that the terminal is configured with an MCG FR 1 and an SCG FR 2; the terminal has performed CPC; during the gap configured by the SN, the terminal returns to the network in advance; and during the gap configured by the SN, the terminal requests to reconfigure the gap or switch the gap.

In another possible implementation, that the first sending module 610 sends the first request to the SN includes any one of the following: in a case that the terminal is configured with a split SRB 1 or SRB 3, and an SCG in which the terminal is located is in an active state, the terminal sends the first request to the SN by using the split SRB 1 or SRB 3; in a case that the terminal is configured with the split SRB 1 or SRB 3, but the SCG is in an inactive state, the terminal sends the first request to the SN by using the MCG; and in a case that the terminal is not configured with the split SRB 1 or SRB 3, the terminal sends the first request to the SN by using the MCG.

In another possible implementation, the gap configuration information includes at least one of the following: a gap identifier; a gap type; gap-related time information; sixth indication information for indicating enabling or disabling at least one gap configuration; seventh indication information for indicating that the terminal releases at least one gap configuration; eighth indication information for indicating a DC-related working mode during the gap; and ninth indication information for indicating that the terminal switches the gap.

In another possible implementation, at least one of the following included in the gap configuration information is determined by the MN: a configuration of per UE gap; a configuration of per FR gap; a configuration of the FR 1 gap in a case that the terminal is configured with intra-FR 1 DC; a configuration of the FR 2 gap in a case that the terminal is configured with intra-FR 2 DC; a configuration of the FR 1 gap in a case that the terminal is configured with an MCG FR 1 and an SCG FR 2; a configuration of the FR 2 gap in a case that the terminal is configured with an MCG FR 2 and an SCG FR 1; a configuration of the MCG gap; a configuration of one shot gap requested from the MN; and a configuration of the periodic gap requested from the MN.

In another possible implementation, at least one of the following included in the gap configuration information is determined by the SN: a configuration of the FR 1 gap in a case that the terminal is configured with an MCG FR 2 and an SCG FR 1; a configuration of the FR 2 gap in a case that the terminal is configured with an MCG FR 1 and an SCG FR 2; a configuration of the SCG gap; a configuration of one shot gap requested from the SN; and a configuration of the periodic gap requested from the SN.

In another possible implementation, the apparatus 600 further includes a configuration module, configured to configure or reconfigure at least one gap based on the gap configuration information.

In another possible implementation, the configuration module is configured to determine, based on the gap configuration information, a time unit in which a start time or an end time of the gap is located, where the time unit includes at least one of a system frame number, a subframe position, a slot position, and a symbol position.

In another possible implementation, the configuration module is configured to determine, based on a time difference between the MCG and the SCG, a time unit in which a start time or an end time of the MCG gap or the SCG gap is located.

In another possible implementation, the first sending module 610 is further configured to send a second request to the network device, where the second request is used to request the network device to use a target gap, and the target gap is at least one configured gap; and the first receiving module 620 is further configured to: in a case of receiving response information sent by the network device, use or not use the target gap based on the response information.

In another possible implementation, the second request includes at least one of the following: an identifier of the target gap; a type of the target gap; and a time domain offset that needs to be used in a start time of the target gap.

In another possible implementation, the first sending module 610 sends the second request to the MN in a case that at least one of the following is satisfied: the target gap is a gap configured by the MN; the target gap is an MCG-related gap; the target gap is a gap configured by the SN, but the SCG is in a deactivated state; the terminal returns to the network in advance during the target gap; and requesting to use another gap, or being switched to another gap during the target gap, where the another gap is a gap in at least one gap other than the target gap.

In another possible implementation, the first sending module 610 sends the second request to the SN in a case that at least one of the following is satisfied: the target gap is a gap configured by the SN; the target gap is an SCG-related gap; the target gap is a gap configured by the MN or an MCG-related gap, but the MCG is in an unreachable state; the terminal returns to the network in advance during the target gap; and requesting to use another gap, or being switched to another gap during the target gap, where the another gap is a gap in at least one gap other than the target gap.

Figure 7:
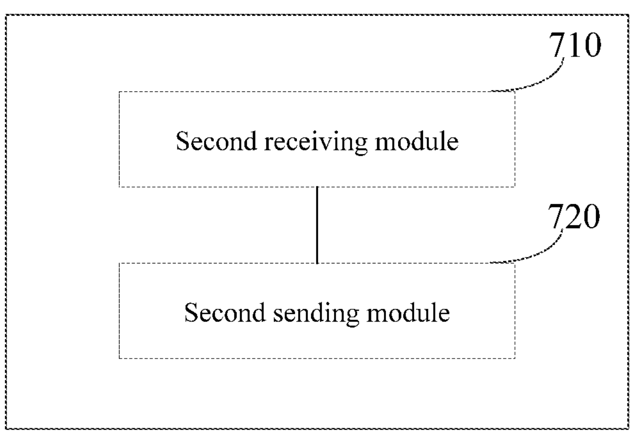
FIG. 7 is a schematic structural diagram of an apparatus for configuring gap according to another exemplary embodiment of this application.

FIG. 7 is a structural schematic diagram of an apparatus 700 for configuring gap according to another exemplary embodiment of this application, the apparatus 700 is applied to a network device, and the apparatus 700 includes: a second receiving module 710, configured to receive a first request sent by a terminal, where the first request is used to request the network device to configure or reconfigure at least one gap; and a second sending module 720, configured to send gap configuration information to the terminal, where the gap configuration information is used for the terminal to configure or reconfigure the at least one gap.

In a possible implementation, when the terminal is configured to be in the DC state, the network device includes an MN and/or an SN, and the gap configuration information is determined by the MN and/or the SN; and when the terminal is not configured to be in the DC state, the network node includes a first serving base station that provides an access service for the terminal, the gap configuration information is determined by the first serving base station and/or a second serving base station, and the second serving base station includes at least one candidate SN.

In another possible implementation, the first request carries at least one of the following: a gap identifier; a gap type; gap-related time information; first indication information for indicating a request type of the first request, where the request type includes at least one of adding a gap configuration, modifying a gap configuration, and releasing a gap configuration; second indication information for requesting enabling or disabling at least one gap; third indication information for indicating that the terminal returns to a network in advance during the gap; fourth indication information for indicating that the terminal requests to reconfigure the gap during the gap, or the terminal requests to switch the gap during the gap; and fifth indication information for indicating a dual connectivity (DC)-related working mode of the terminal during the gap.

In another possible implementation, the gap type includes at least one of the following: per UE gap, per FR gap, an FR 1 gap, an FR 2 gap, per CG gap, an MCG gap, an SCG gap, a periodic gap, one shot gap, per direction gap, a UL gap, and a DL gap.

In another possible implementation, the gap-related time information includes at least one of a gap length, a gap period, a gap start time, a gap end time, and a gap scale factor.

In another possible implementation, the gap configuration information includes at least one of the following: a gap identifier; a gap type; gap-related time information; sixth indication information for indicating enabling or disabling at least one gap configuration; seventh indication information for indicating that the terminal releases at least one gap configuration; eighth indication information for indicating a DC-related working mode during the gap; and ninth indication information for indicating that the terminal switches the gap.

In another possible implementation, at least one of the following included in the gap configuration information is determined by the MN: a configuration of per UE gap; a configuration of per FR gap; a configuration of the FR 1 gap in a case that the terminal is configured with intra-FR 1 DC; a configuration of the FR 2 gap in a case that the terminal is configured with intra-FR 2 DC; a configuration of the FR 1 gap in a case that the terminal is configured with an MCG FR 1 and an SCG FR 2; a configuration of the FR 2 gap in a case that the terminal is configured with an MCG FR 2 and an SCG FR 1; a configuration of the MCG gap; a configuration of one shot gap requested from the MN; and a configuration of the periodic gap requested from the MN.

In another possible implementation, at least one of the following included in the gap configuration information is determined by the SN: a configuration of the FR 1 gap in a case that the terminal is configured with an MCG FR 2 and an SCG FR 1; a configuration of the FR 2 gap in a case that the terminal is configured with an MCG FR 1 and an SCG FR 2; a configuration of the SCG gap; a configuration of one shot gap requested from the SN; and a configuration of the periodic gap requested from the SN.

In another possible implementation, the second sending module 720 sends at least one of the following to the SN: at least part of information carried in the first request; at least part of information in gap configuration information configured by the MN; at least part of information in gap configuration information configured by a source SN in a case that the SN is a switched target SN; at least part of information in a first request received by the source SN in a case that the SN is a switched target SN; and configuration information of a gap that the terminal requests to use or configuration information of a gap that the terminal is using.

In another possible implementation, the second sending module 720 sends at least one of the following to the MN: at least part of information carried in the first request; at least part of information in gap configuration information configured by the SN; and configuration information of a gap that the terminal requests to use or configuration information of a gap that the terminal is using.

In another possible implementation, the second receiving module 710 is further configured to receive a second request sent by the terminal, where the second request is used to request the network device to use a target gap, and the target gap belongs to the at least one gap; and the second sending module 720 is further configured to send response information to the terminal, where the response information is used to instruct the terminal to use or not use the target gap.

In another possible implementation, the second request includes at least one of the following: an identifier of the target gap; a type of the target gap; and a time domain offset that needs to be used in a start time of the target gap.

The apparatus 600 or 700 for configuring gap in this embodiment of this application may be an apparatus or an apparatus or electronic device with an operating system, or may be a component, an integrated circuit, or a chip in a terminal. The apparatus or electronic device may be a mobile terminal, or a non-mobile terminal. For example, the mobile terminal may include but is not limited to the foregoing listed types of terminals 11. The non-mobile terminal may be a server, a network attached storage (NAS), a personal computer (PC), a television (TV), a teller machine, or a self-service machine. This is not specifically limited in this embodiment of this application.

The apparatus 600 or 700 for configuring gap provided in this embodiment of this application can implement the processes implemented in the method embodiments from FIG. 2 to FIG. 5, and a same technical effect can be achieved. To avoid repetition, details are not described herein again.

Figure 8:
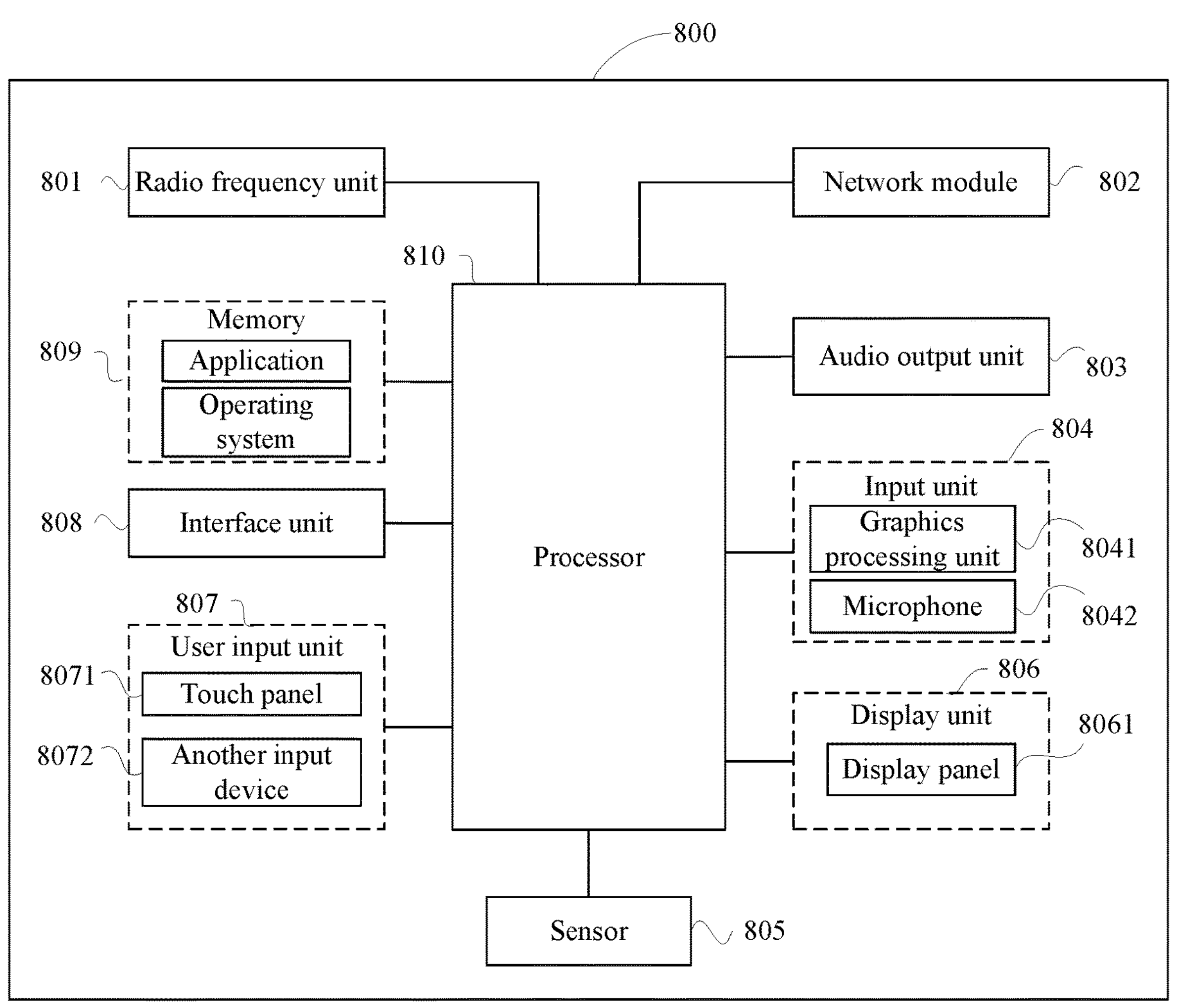
FIG. 8 is a schematic structural diagram of a terminal according to an exemplary embodiment of this application.

An embodiment of this application further provides a terminal, including a processor and a communications interface. The communications interface is coupled to the processor, and the processor is configured to run a program or an instruction to implement the processes of the method embodiments 200 to 400. This terminal embodiment corresponds to the foregoing method embodiment on the terminal side. Each implementation process and implementation of the foregoing method embodiment may be applicable to this terminal embodiment, and a same technical effect can be achieved. Specifically, FIG. 8 is a schematic diagram of a hardware structure of a terminal according to an embodiment of this application.

A terminal 800 includes but is not limited to at least a part of components such as a radio frequency unit 801, a network module 802, an audio output unit 803, an input unit 804, a sensor 805, a display unit 806, a user input unit 807, an interface unit 808, a memory 809, and a processor 810.

A person skilled in the art can understand that the terminal 800 may further include a power supply (such as a battery) that supplies power to each component. The power supply may be logically connected to the processor 810 by using a power supply management system, to implement functions such as charging and discharging management, and power consumption management by using the power supply management system. The terminal structure shown in FIG. 8 constitutes no limitation on the terminal, and the terminal may include more or fewer components than those shown in the figure, or combine some components, or have different component arrangements. Details are not described herein.

It should be understood that, in this embodiment of this application, the input unit 804 may include a graphics processing unit (GPU) 8041 and a microphone 8042. The graphics processing unit 8041 processes image data of a static picture or a video obtained by an image capture apparatus (such as a camera) in a video capture mode or an image capture mode. The display unit 806 may include a display panel 8061, and the display panel 8061 may be configured in a form such as a liquid crystal display or an organic light-emitting diode. The user input unit 807 includes a touch panel 8071 and another input device 8072. The touch panel 8071 is also referred to as a touchscreen. The touch panel 8071 may include two parts: a touch detection apparatus and a touch controller. The another input device 8072 may include but is not limited to a physical keyboard, a functional button (such as a volume control button or a power on/off button), a trackball, a mouse, and a joystick. Details are not described herein.

In the embodiments of this application, after receiving downlink data from a network device, the radio frequency unit 801 sends the downlink data to the processor 810 for processing, and sends uplink data to the network device. Generally, the radio frequency unit 801 includes but is not limited to an antenna, at least one amplifier, a transceiver, a coupler, a low noise amplifier, a duplexer, and the like.

The memory 809 may be configured to store a software program or an instruction and various data. The memory 809 may mainly include a program or instruction storage area and a data storage area. The program or instruction storage area may store an operating system, and an application or an instruction required by at least one function (for example, a sound playing function or an image playing function). In addition, the memory 809 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another non-volatile solid-state storage device.

The processor 810 may include one or more processing units. Optionally, an application processor and a modem processor may be integrated into the processor 810. The application processor mainly processes an operating system, a user interface, an application, an instruction, or the like. The modem processor mainly processes wireless communication, for example, a baseband processor. It can be understood that, alternatively, the modem processor may not be integrated into the processor 810.

The radio frequency unit 801 is configured to: send a first request to a network device, where the first request is used to request the network device to configure or reconfigure at least one gap, and the at least one gap is a gap related to a DC state; and receive gap configuration information sent by the network device, where the gap configuration information is used to configure or reconfigure the at least one gap.

In a possible implementation, when the terminal is configured to be in the DC state, the network device includes an MN and/or an SN, and the gap configuration information is determined by the MN and/or the SN; and when the terminal is not configured to be in the DC state, the network node includes a first serving base station that provides an access service for the terminal, the gap configuration information is determined by the first serving base station and/or a second serving base station, and the second serving base station includes at least one candidate SN.

In another possible implementation, the first request carries at least one of the following: a gap identifier; a gap type; gap-related time information; first indication information for indicating a request type of the first request, where the request type includes at least one of adding a gap configuration, modifying a gap configuration, and releasing a gap configuration; second indication information for requesting enabling or disabling at least one gap; third indication information for indicating that the terminal returns to a network in advance during the gap; fourth indication information for indicating that the terminal requests to reconfigure the gap during the gap, or the terminal requests to switch the gap during the gap; and fifth indication information for indicating a dual connectivity (DC)-related working mode of the terminal during the gap.

In another possible implementation, the gap type includes at least one of the following: per UE gap, per frequency range (per FR) gap, an FR 1 gap, an FR 2 gap, per cell group (per CG) gap, a master cell group (MCG) gap, a secondary cell group (SCG) gap, a periodic gap, one shot gap, per direction gap, an uplink gap, and a downlink gap.

In another possible implementation, the gap-related time information includes at least one of a gap length, a gap period, a gap start time, a gap end time, and a gap scale factor.

In another possible implementation, that the radio frequency unit 801 sends the first request to the network device includes: sending, by the terminal, the first request to the MN in a case that at least one of the following is satisfied: the first request is used to request to configure or reconfigure per UE gap; the first request is used to request to configure or reconfigure an FR 1 gap; the first request is used to request to configure or reconfigure an FR 2 gap; the first request is used to request to configure or reconfigure an MCG gap; the first request is used to request, when no SN is added, to configure an SCG gap; the terminal has performed condition handover (CHO); the first request is used to request the terminal to return to a network in advance during the gap; and the first request is used to request the terminal to reconfigure or switch the gap during the gap.

In another possible implementation, the radio frequency unit 801 sends the first request to the MN through the MCG; or/and the first request is sent to the MN through a split signalling radio bearer (SRB) 1 or SRB 3.

In another possible implementation, the radio frequency unit 801 sends the first request to the SN in a case that at least one of the following is satisfied: the first request is used to request to configure or reconfigure an SCG gap; the first request is used to request to configure or reconfigure an FR 1 gap in a case that the terminal is configured with an MCG FR 2 and an SCG FR 1; the first request is used to request to configure or reconfigure an FR 2 gap in a case that the terminal is configured with an MCG FR 1 and an SCG FR 2; the terminal has performed conditional PSCell change (CPC); during the gap configured by the SN, the terminal returns to the network in advance; and during the gap configured by the SN, the terminal requests to reconfigure the gap or switch the gap.

In another possible implementation, that the radio frequency unit 801 sends the first request to the SN includes any one of the following: in a case that the terminal is configured with a split SRB 1 or SRB 3, and an SCG in which the terminal is located is in an active state, the terminal sends the first request to the SN by using the split SRB 1 or SRB 3; in a case that the terminal is configured with the split SRB 1 or SRB 3, but the SCG is in an inactive state, the terminal sends the first request to the SN by using the MCG; and in a case that the terminal is not configured with the split SRB 1 or SRB 3, the terminal sends the first request to the SN by using the MCG.

In another possible implementation, the gap configuration information includes at least one of the following: a gap identifier; a gap type; gap-related time information; sixth indication information for indicating enabling or disabling at least one gap configuration; seventh indication information for indicating that the terminal releases at least one gap configuration; eighth indication information for indicating a DC-related working mode during the gap; and ninth indication information for indicating that the terminal switches the gap.

In another possible implementation, at least one of the following included in the gap configuration information is determined by the MN: a configuration of per UE gap; a configuration of per FR gap; a configuration of the FR 1 gap in a case that the terminal is configured with intra-FR 1 DC; a configuration of the FR 2 gap in a case that the terminal is configured with intra-FR 2 DC; a configuration of the FR 1 gap in a case that the terminal is configured with an MCG FR 1 and an SCG FR 2; a configuration of the FR 2 gap in a case that the terminal is configured with an MCG FR 2 and an SCG FR 1; a configuration of the MCG gap; a configuration of one shot gap requested from the MN; and a configuration of the periodic gap requested from the MN.

In another possible implementation, at least one of the following included in the gap configuration information is determined by the SN: a configuration of the FR 1 gap in a case that the terminal is configured with an MCG FR 2 and an SCG FR 1; a configuration of the FR 2 gap in a case that the terminal is configured with an MCG FR 1 and an SCG FR 2; a configuration of the SCG gap; a configuration of one shot gap requested from the SN; and a configuration of the periodic gap requested from the SN.

In another possible implementation, the processor 810 is configured to configure or reconfigure at least one gap based on the gap configuration information.

In another possible implementation, the processor 810 is configured to determine, based on the gap configuration information, a time unit in which a start time or an end time of the gap is located, where the time unit includes at least one of a system frame number, a subframe position, a slot position, and a symbol position.

In another possible implementation, the processor 810 is configured to determine, based on a time difference between the MCG and the SCG, a time unit in which a start time or an end time of the MCG gap or the SCG gap is located.

In another possible implementation, the radio frequency unit 801 is further configured to: send a second request to the network device, where the second request is used to request the network device to use a target gap, and the target gap is at least one configured gap; and in a case of receiving response information sent by the network device, use or not use the target gap based on the response information.

In another possible implementation, the second request includes at least one of the following: an identifier of the target gap; a type of the target gap; and a time domain offset that needs to be used in a start time of the target gap.

In another possible implementation, the radio frequency unit 801 sends the second request to the MN in a case that at least one of the following is satisfied: the target gap is a gap configured by the MN; the target gap is an MCG-related gap; the target gap is a gap configured by the SN, but the SCG is in a deactivated state; the terminal returns to the network in advance during the target gap; and requesting to use another gap, or being switched to another gap during the target gap, where the another gap is a gap in at least one gap other than the target gap.

In another possible implementation, the radio frequency unit 801 sends the second request to the SN in a case that at least one of the following is satisfied: the target gap is a gap configured by the SN; the target gap is an SCG-related gap; the target gap is a gap configured by the MN or an MCG-related gap, but the MCG is in an unreachable state; the terminal returns to the network in advance during the target gap; and requesting to use another gap, or being switched to another gap during the target gap, where the another gap is a gap in at least one gap other than the target gap.

By fully considering whether the terminal is configured to be in the DC state and then requesting the gap configuration from the corresponding network device, a flexible gap configuration can be realized based on the DC state, and this avoids the problem of transferring gap configuration related information between network interfaces, reduces an application/configuration delay of the gap and system signalling overheads, and improves communication performance of the UE in the DC state (or architecture).

An embodiment of this application further provides a network device, including a processor and a communications interface. The communications interface is coupled to the processor, and the processor is configured to run a program or an instruction to implement the processes of the method according to the method embodiment 500. This network device embodiment is corresponding to the foregoing method embodiment of the network device. Each implementation process and implementation of the foregoing method embodiment may be applicable to this network device embodiment, and a same technical effect can be achieved.

Figure 9:
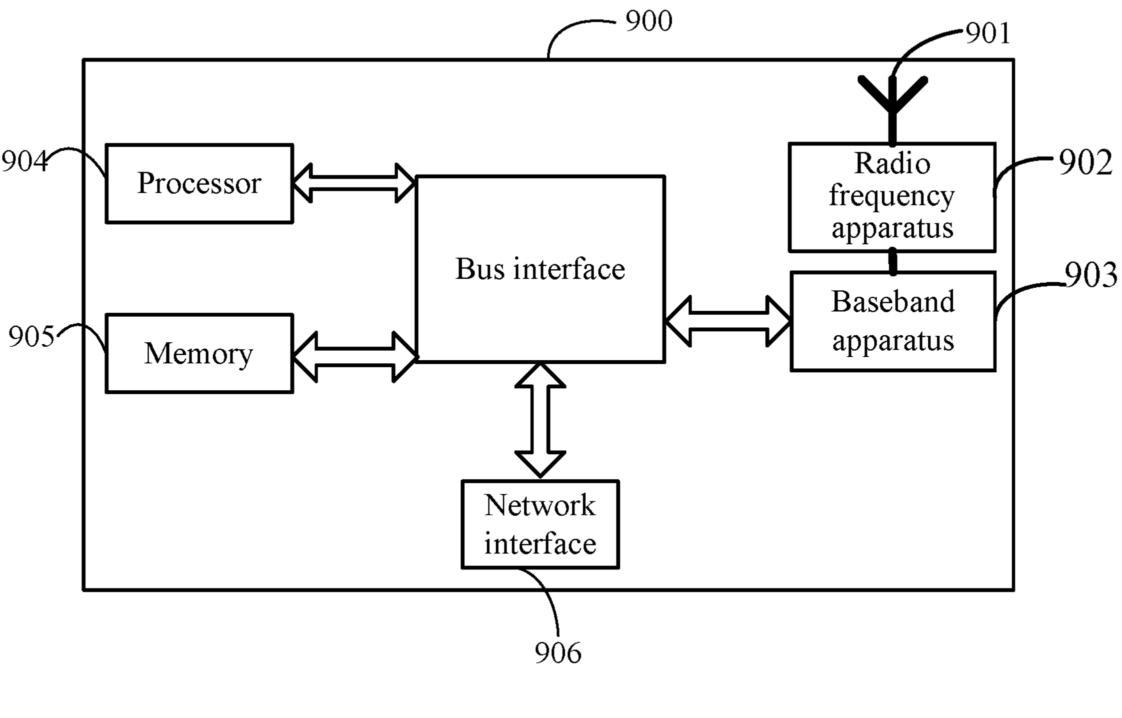
FIG. 9 is a schematic structural diagram of a network device according to an exemplary embodiment of this application.

Specifically, an embodiment of this application further provides a network device. As shown in FIG. 9, a network device 900 includes an antenna 901, a radio frequency apparatus 902, and a baseband apparatus 903. The antenna 901 is connected to the radio frequency apparatus 902. In an uplink direction, the radio frequency apparatus 902 receives information by using the antenna 901, and sends the received information to the baseband apparatus 903 for processing. In a downlink direction, the baseband apparatus 903 processes information that needs to be sent, and sends processed information to the radio frequency apparatus 902. The radio frequency apparatus 902 processes the received information, and sends processed information by using the antenna 901.

The foregoing band processing apparatus may be located in the baseband apparatus 903. In the foregoing embodiment, a method performed by the network device may be implemented in the baseband apparatus 903. The baseband apparatus 903 includes a processor 904 and a memory 905.

The baseband apparatus 903 may include, for example, at least one baseband board, where a plurality of chips are disposed on the baseband board. As shown in FIG. 9, one chip is, for example, the processor 904, which is connected to the memory 905, so as to invoke a program in the memory 905 to perform operations of the network device shown in the foregoing method embodiment.

The baseband apparatus 903 may further include a network interface 906, configured to exchange information with the radio frequency apparatus 902. For example, the interface is a common public radio interface (CPRI for short).

Specifically, the network device in this embodiment of the present invention further includes an instruction or a program stored in the memory 905 and executable on the processor 904. The processor 904 invokes the instruction or the program in the memory 905 to perform the method performed by the modules shown in FIG. 7, with the same technical effect achieved. To avoid repetition, details are not described herein again.

An embodiment of this application further provides a readable storage medium, where the readable storage medium stores a program or an instruction, and when the program or the instruction is executed by a processor, the processes of the embodiment of the foregoing method for configuring gap are implemented, and a same technical effect can be achieved. To avoid repetition, details are not described herein again.

The processor is a processor in the terminal in the foregoing embodiment. The readable storage medium includes a computer-readable storage medium, such as a computer read-only memory (ROM).

An embodiment of this application further provides a chip. The chip includes a processor and a communications interface, the communications interface is coupled to the processor, and the processor is configured to run a program or an instruction of a network device to implement the processes of the embodiment of the foregoing method for configuring gap, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer program product. The computer program product includes a processor, a memory, and a program or an instruction stored in the memory and executable on the processor. When the program or the instruction is executed by the processor, the processes of the embodiment of the foregoing method for configuring gap are implemented, and a same technical effect can be achieved. To avoid repetition, details are not described herein again.

It should be noted that, in this specification, the term “include”, “comprise”, or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, an air-conditioner, a network device, or the like) to perform the method described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A method for configuring gap, comprising:

sending, by a terminal, a first request to a network device, wherein the first request is used to request the network device to configure or reconfigure at least one gap, and the at least one gap is a gap related to a dual connectivity (DC) state; and receiving, by the terminal, gap configuration information sent by the network device, wherein the gap configuration information is used to configure or reconfigure the at least one gap, wherein when the terminal is configured to be in the DC state, the network device comprises a master node (MN) and/or a secondary node (SN), and the gap configuration information is determined by the MN and/or the SN, wherein the sending, by the terminal, the first request to the network device comprises:

sending, by the terminal, the first request to the MN in a case that at least one of the following is satisfied:

the first request is used to request to configure or reconfigure per UE gap;

the first request is used to request to configure or reconfigure a Frequency Range (FR) 1 gap;

the first request is used to request to configure or reconfigure an FR 2 gap;

the first request is used to request to configure or reconfigure a master cell group (MCG) gap;

the first request is used to request, when no SN is added, to configure a secondary cell group (SCG) gap;

the terminal has performed condition handover (CHO);

the first request is used to request the terminal to return to a network in advance during the gap; or the first request is used to request the terminal to reconfigure or switch the gap during the gap, and/or wherein the sending, by the terminal, the first request to the network device comprises:

sending, by the terminal, the first request to the SN in a case that at least one of the following is satisfied:

the first request is used to request to configure or reconfigure an SCG gap;

the first request is used to request to configure or reconfigure an FR 1 gap in a case that the terminal is configured with an MCG FR 2 and an SCG FR 1;

the first request is used to request to configure or reconfigure an FR 2 gap in a case that the terminal is configured with an MCG FR 1 and an SCG FR 2;

the terminal has performed conditional PSCell change (CPC);

during the gap configured by the SN, the terminal returns to the network in advance; or during the gap configured by the SN, the terminal requests to reconfigure the gap or switch the gap.

2. The method according to claim 1, wherein when the terminal is not configured to be in the DC state, the network node comprises a first serving base station that provides an access service for the terminal, the gap configuration information is determined by the first serving base station and/or a second serving base station, and the second serving base station comprises at least one candidate SN.

3. The method according to claim 1, wherein the first request carries at least one of the following:

a gap identifier;

a gap type;

gap-related time information;

first indication information for indicating a request type of the first request, wherein the request type comprises at least one of adding a gap configuration, modifying a gap configuration, and releasing a gap configuration;

second indication information for requesting enabling or disabling at least one gap;

third indication information for indicating that the terminal returns to a network in advance during the gap;

fourth indication information for indicating that the terminal requests to reconfigure the gap during the gap, or the terminal requests to switch the gap during the gap; and fifth indication information for indicating a DC-related working mode of the terminal during the gap.

4. The method according to claim 3, wherein the gap type comprises at least one of the following:

per UE gap, per frequency range (per FR) gap, an FR 1 gap, an FR 2 gap, per cell group (per CG) gap, a master cell group (MCG) gap, a secondary cell group (SCG) gap, a periodic gap, one shot gap, per direction gap, an uplink gap, and a downlink gap;

wherein the gap-related time information comprises at least one of a gap length, a gap period, a gap start time, a gap end time, and a gap scale factor.

5. The method according to claim 2, wherein the sending the first request to the MN comprises:

sending the first request to the MN by using an MCG; and/or sending the first request to the MN by using a split signaling radio bearer (SRB) 1 or an SRB 3.

6. The method according to claim 2, wherein the sending, by the terminal, the first request to the SN comprises any one of the following:

in a case that the terminal is configured with a split SRB 1 or SRB 3, and an SCG in which the terminal is located is in an active state, the terminal sends the first request to the SN by using the split SRB 1 or SRB 3;

in a case that the terminal is configured with the split SRB 1 or SRB 3, but the SCG is in an inactive state, the terminal sends the first request to the SN by using the MCG; and in a case that the terminal is not configured with the split SRB 1 or SRB 3, the terminal sends the first request to the SN by using the MCG.

7. The method according to claim 1, wherein the gap configuration information comprises at least one of the following:

a gap identifier;

a gap type;

gap-related time information;

sixth indication information for indicating enabling or disabling at least one gap configuration;

seventh indication information for indicating that the terminal releases at least one gap configuration;

eighth indication information for indicating a DC-related working mode during the gap; and ninth indication information for indicating that the terminal switches the gap.

8. The method according to claim 7, wherein at least one of the following comprised in the gap configuration information is determined by the MN:

a configuration of per UE gap;

a configuration of per FR gap;

a configuration of the FR 1 gap in a case that the terminal is configured with intra-FR 1 DC;

a configuration of the FR 2 gap in a case that the terminal is configured with intra-FR 2 DC;

a configuration of the FR 1 gap in a case that the terminal is configured with an MCG FR 1 and an SCG FR 2;

a configuration of the FR 2 gap in a case that the terminal is configured with an MCG FR 2 and an SCG FR 1;

a configuration of the MCG gap;

a configuration of one shot gap requested from the MN; and a configuration of the periodic gap requested from the MN.

9. The method according to claim 7, wherein at least one of the following comprised in the gap configuration information is determined by the SN;

a configuration of the FR 1 gap in a case that the terminal is configured with an MCG FR 2 and an SCG FR 1;

a configuration of the FR 2 gap in a case that the terminal is configured with an MCG FR 1 and an SCG FR 2;

a configuration of the SCG gap; a configuration of one shot gap requested from the SN; and a configuration of the periodic gap requested from the SN.

10. The method according to claim 1, wherein after the receiving, by the terminal, gap configuration information sent by the network device, the method further comprises:

configuring or reconfiguring, by the terminal, at least one gap based on the gap configuration information.

11. The method according to claim 10, wherein the configuring a gap based on the gap configuration information comprises:

determining, based on the gap configuration information, a time unit in which a start time or an end time of the gap is located, wherein the time unit comprises at least one of a system frame number, a subframe position, a slot position, and a symbol position.

12. The method according to claim 11, wherein the determining, based on the gap configuration information, a time unit in which a start time or an end time of the gap is located comprises:

determining, based on a time difference between the MCG and the SCG, a time unit in which a start time or an end time of the MCG gap or the SCG gap is located.

13. The method according to claim 1, wherein the method further comprises:

sending, by the terminal, a second request to the network device, wherein the second request is used to request the network device to use a target gap, and the target gap is at least one configured gap; and in a case of receiving response information sent by the network device, using or not using the target gap based on the response information.

14. A method for configuring gap, comprising:

receiving, by a network device, a first request sent by a terminal, wherein the first request is used to request the network device to configure or reconfigure at least one gap, and the at least one gap is a gap related to a dual connectivity (DC) state; and sending, by the network device, gap configuration information to the terminal, wherein the gap configuration information is used for the terminal to configure or reconfigure the at least one gap, wherein when the terminal is configured to be in the dual connectivity (DC) state, the network device comprises a master node (MN) or a secondary node (SN), and the gap configuration information is determined by the MN and/or the SN, wherein the receiving, by the network device, the first request sent by the terminal comprises:

receiving, by the MN, the first request sent by the terminal in a case that at least one of the following is satisfied:

the first request is used to request to configure or reconfigure per UE gap;

the first request is used to request to configure or reconfigure a Frequency Range (FR) 1 gap;

the first request is used to request to configure or reconfigure an FR 2 gap;

the first request is used to request to configure or reconfigure a master cell group (MCG) gap;

the first request is used to request, when no SN is added, to configure a secondary cell group (SCG) gap;

the terminal has performed condition handover (CHO);

the first request is used to request the terminal to return to a network in advance during the gap; or the first request is used to request the terminal to reconfigure or switch the gap during the gap, and/or wherein the receiving, by the network device, the first request sent by the terminal comprises:

receiving, by the SN, the first request sent by the terminal in a case that at least one of the following is satisfied:

the first request is used to request to configure or reconfigure an SCG gap;

the first request is used to request to configure or reconfigure an FR 1 gap in a case that the terminal is configured with an MCG FR 2 and an SCG FR 1;

the first request is used to request to configure or reconfigure an FR 2 gap in a case that the terminal is configured with an MCG FR 1 and an SCG FR 2;

the terminal has performed conditional PSCell change (CPC);

during the gap configured by the SN, the terminal returns to the network in advance; or during the gap configured by the SN, the terminal requests to reconfigure the gap or switch the gap.

15. A network device, comprising a processor, a memory, and a program or an instruction stored in the memory and executable for the processor, wherein when the program or the instruction is executed by the processor, steps of the method according to claim 14 are implemented.

16. The method according to claim 14, wherein when the terminal is not configured to be in the DC state, the network node comprises a first serving base station that provides an access service for the terminal, the gap configuration information is determined by the first serving base station and/or a second serving base station, and the second serving base station comprises at least one candidate SN.

17. The method according to claim 14, wherein the first request carries at least one of the following:

a gap identifier;

a gap type;

gap-related time information;

first indication information for indicating a request type of the first request, wherein the request type comprises at least one of adding a gap configuration, modifying a gap configuration, and releasing a gap configuration;

second indication information for requesting enabling or disabling at least one gap;

third indication information for indicating that the terminal returns to a network in advance during the gap;

fourth indication information for indicating that the terminal requests to reconfigure the gap during the gap, or the terminal requests to switch the gap during the gap; and fifth indication information for indicating a dual connectivity (DC)-related working mode of the terminal during the gap.

18. A terminal, comprising a processor, a memory, and a program or an instruction stored in the memory and executable on the processor, wherein when the program or the instruction is executed by the processor, following steps are implemented:

sending a first request to a network device, wherein the first request is used to request the network device to configure or reconfigure at least one gap, and the at least one gap is a gap related to a dual connectivity (DC) state; and receiving gap configuration information sent by the network device, wherein the gap configuration information is used to configure or reconfigure the at least one gap, wherein when the terminal is configured to be in the DC state, the network device comprises a master node (MN) and/or a secondary node (SN), and the gap configuration information is determined by the MN and/or the SN, wherein the sending the first request to the network device comprises:

sending the first request to the MN in a case that at least one of the following is satisfied:

the first request is used to request to configure or reconfigure per UE gap;

the first request is used to request to configure or reconfigure a Frequency Range (FR) 1 gap;

the first request is used to request to configure or reconfigure an FR 2 gap;

the first request is used to request to configure or reconfigure a master cell group (MCG) gap;

the first request is used to request, when no SN is added, to configure a secondary cell group (SCG) gap;

the terminal has performed condition handover (CHO);

the first request is used to request the terminal to return to a network in advance during the gap; or the first request is used to request the terminal to reconfigure or switch the gap during the gap, and/or wherein the sending the first request to the network device comprises:

sending the first request to the SN in a case that at least one of the following is satisfied:

the first request is used to request to configure or reconfigure an SCG gap;

the first request is used to request to configure or reconfigure an FR 1 gap in a case that the terminal is configured with an MCG FR 2 and an SCG FR 1;

the first request is used to request to configure or reconfigure an FR 2 gap in a case that the terminal is configured with an MCG FR 1 and an SCG FR 2;

the terminal has performed conditional PSCell change (CPC);

during the gap configured by the SN, the terminal returns to the network in advance; or during the gap configured by the SN, the terminal requests to reconfigure the gap or switch the gap.

19. The terminal according to claim 18, wherein when the terminal is not configured to be in the DC state, the network node comprises a first serving base station that provides an access service for the terminal, the gap configuration information is determined by the first serving base station and/or a second serving base station, and the second serving base station comprises at least one candidate SN.

20. The terminal according to claim 18, wherein the first request carries at least one of the following:

a gap identifier;

a gap type;

gap-related time information;

first indication information for indicating a request type of the first request, wherein the request type comprises at least one of adding a gap configuration, modifying a gap configuration, and releasing a gap configuration;

second indication information for requesting enabling or disabling at least one gap;

third indication information for indicating that the terminal returns to a network in advance during the gap;

fourth indication information for indicating that the terminal requests to reconfigure the gap during the gap, or the terminal requests to switch the gap during the gap; and fifth indication information for indicating a DC-related working mode of the terminal during the gap.

* * * * *